United States Patent

Kilian, III et al.

[11] Patent Number: 5,390,439
[45] Date of Patent: Feb. 21, 1995

[54] BAIT CONTAINER FLOW REGULATOR

[76] Inventors: Leo J. Kilian, III, 15920 Litten Way; Richard J. Lewis, 15931 Litten Way, both of Ramona, Calif. 92065

[21] Appl. No.: 33,610

[22] Filed: Mar. 16, 1993

[51] Int. Cl.⁶ .................. A01K 63/00; A01K 97/04
[52] U.S. Cl. ............................................ 43/55; 43/56; 43/57
[58] Field of Search .................. 43/55, 56, 57; 119/3, 119/5; 114/255

[56] References Cited

U.S. PATENT DOCUMENTS

| | | | |
|---|---|---|---|
| 636,381 | 11/1899 | Hamel . | |
| 706,407 | 8/1902 | Hall . | |
| 738,726 | 9/1903 | Lytle . | |
| 1,341,157 | 5/1920 | Sublett . | |
| 1,555,467 | 9/1925 | Graham . | |
| 1,581,072 | 4/1926 | Lumsden . | |
| 1,822,190 | 9/1931 | Ziele . | |
| 1,996,279 | 4/1935 | Dillon | 4/292 |
| 1,996,303 | 4/1935 | McConnell | 248/20 |
| 2,001,468 | 5/1935 | Moutoux | 43/55 |
| 2,055,912 | 9/1936 | Schonger | 43/56 |
| 2,151,225 | 3/1939 | Newton | 43/55 |
| 2,303,767 | 12/1942 | Pierson | 119/5 |
| 2,309,534 | 1/1943 | Powell | 43/56 |
| 2,757,916 | 8/1956 | Osborn et al. | 261/121 |
| 3,078,612 | 2/1963 | Wait | 43/55 |
| 3,145,500 | 8/1964 | French et al. | 43/103 |
| 3,273,276 | 9/1966 | Englesson | 43/55 |
| 3,334,438 | 8/1967 | Fellers | 43/56 |
| 3,339,305 | 9/1967 | Smith | 43/56 |
| 3,351,328 | 11/1967 | Vetterli | 261/112 |
| 3,449,855 | 6/1969 | Hassell | 43/56 |
| 3,499,243 | 3/1970 | Artin | 43/56 |
| 3,710,502 | 1/1973 | Bracey | 43/56 |
| 3,716,938 | 2/1973 | Ammons | 43/55 |
| 4,033,280 | 7/1977 | Wood | 43/57 |
| 4,074,651 | 2/1978 | Arduser | 43/57 |
| 4,275,522 | 6/1981 | Glover | 43/56 |
| 4,297,804 | 11/1981 | Weld | 43/55 |
| 4,708,084 | 11/1987 | Campau | 43/57 |
| 4,748,765 | 6/1988 | Martin | 43/55 |
| 4,751,752 | 6/1988 | Ewing | 4/287 |
| 4,772,278 | 9/1988 | Baber | 604/324 |
| 4,994,177 | 2/1991 | Bogar | 43/57 |
| 5,010,836 | 4/1991 | Riviezzo | 43/57 |
| 5,165,198 | 11/1992 | Kilian | 43/55 |
| 5,165,358 | 11/1992 | Fielder | 43/55 |

FOREIGN PATENT DOCUMENTS 0046751 12/1974 Japan .

OTHER PUBLICATIONS

"Super Live Bait Containers", Aqua World Brochure, San Clemente, Calif.

*Primary Examiner*—Kurt Rowan
*Attorney, Agent, or Firm*—Baker, Maxham, Jester & Meador

[57] ABSTRACT

A bait container flow regulator is provided for use in a bait container system for transporting live bait to a fishing site. The bait container system includes a water containment vessel for carrying water and a quantity of bait fish. The water containment vessel has a closed bottom, an open (or closable) top, a side wall portion, a water inlet for delivering a flow of water to the water containment vessel and one or more water outlets. The bait container flow regulator includes a water inlet conduit that is mountable to the water inlet and sized to extend to a water discharge location in the water containment vessel. A water regulating outlet is mounted on the water inlet conduit for positioning at the water discharge location. A discharge cap is mounted on the water inlet conduit for limiting the flow of water through the water regulating outlet. The discharge cap is configured for movement in response to the flow of water between a first position substantially covering the water regulating outlet when little or no water is flowing in the water inlet conduit, to a second position wherein the water regulating outlet is at least partially uncovered as water flow in the water inlet conduit increases.

35 Claims, 4 Drawing Sheets

BAIT CONTAINER FLOW REGULATOR

BACKGROUND OF THE INVENTION

The present invention is directed to apparatus for use in conjunction with containers and vessels for carrying live bait during fishing expeditions, and more particularly to water circulation systems that provide a supply of fresh oxygenated water to sustain bait fish during, and subsequent to, transport to a fishing site.

In salt water fishing, it is common to use live bait that must be sustained in a bait bag or other water containing vessel during the course of a fishing expedition. Bait containers that are designed to be mounted over the stern of a fishing boat are known. These water containing vessels typically include a water inlet providing a source of fresh oxygenated water, and one or more water outlets typically consisting of holes in the upper aft side of the bait bag.

One of the disadvantages of prior art bait container systems is that the flow of inlet water is not regulated by restricting or properly directing the flow of water into the bait bag. Excess flow can tire the bait fish and a substantial loss of bait may result between the time it takes to obtain the bait and transport them to a fishing site. Another concern with unregulated or improperly regulated water inlet systems is that the sediments which invariably collect on the bottom of the bait container, such as fish scales and other matter produced by the bait fish, are disturbed by the water flow and dispersed through the bait container. This can suffocate the bait fish.

Reducing the flow of inlet water to the bait container is one solution to the foregoing problem, but this reduces the rate at which water is replaced, and decreases available oxygen. Thus, there is an evident need for a bait container flow regulator that regulates the flow of water into the bait container without tiring the fish or disturbing bottom sediments, while maintaining maximum volumetric water flow into the bait container.

SUMMARY OF THE INVENTION

In accordance with the foregoing objects and advantages, a bait container flow regulator is provided for use in a bait container system for transporting live bait to a fishing site. The bait container system includes a water containment vessel for carrying water and a quantity of bait fish. The water containment vessel has a closed bottom, an open (or closable) top, a side wall portion, a water inlet for delivering a flow of water to the water containment vessel and one or more water outlets. The bait container flow regulator includes a water inlet conduit that is mountable to the water inlet and sized to extend to a water discharge location in the water containment vessel. A water regulating outlet is mounted on the water inlet conduit for positioning at the water discharge location. A discharge cap is mounted on the water inlet conduit for limiting the flow of water through the water regulating outlet. The discharge cap is configured for movement in response to the flow of water between a first position substantially covering the water regulating outlet when little or no water is flowing in the water inlet conduit, to a second position wherein the water regulating outlet is at least partially uncovered as water flow in the water inlet conduit increases.

BRIEF DESCRIPTION OF THE DRAWINGS

The objects, advantages and features of the present invention will be more clearly understood by reference to the following detailed disclosure and the accompanying drawing in which.

DETAILED DESCRIPTION OF THE PREFERRED EMBODIMENTS

Figure 1:
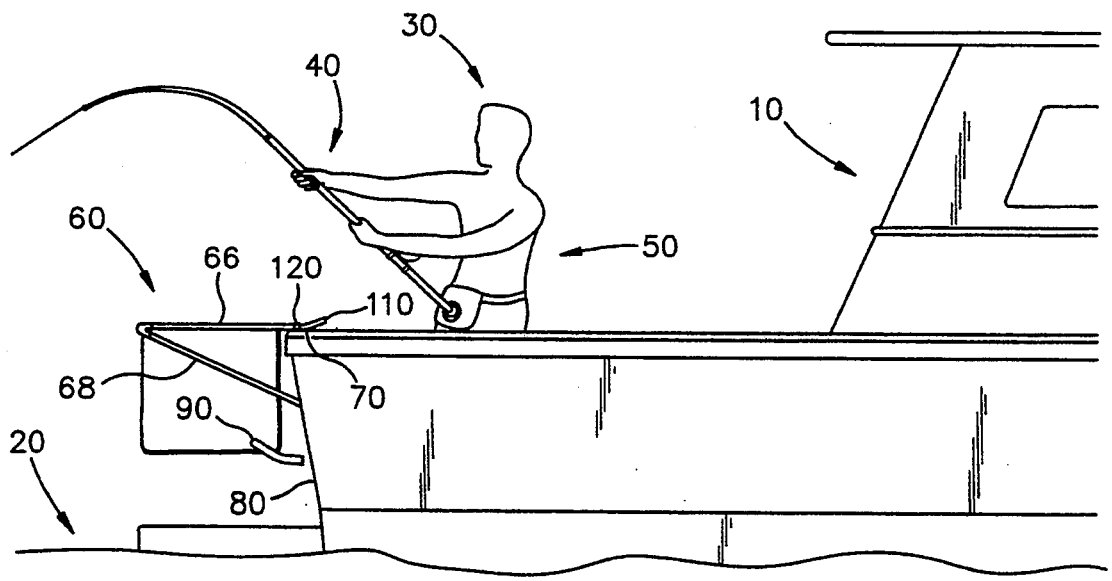
FIG. 1 is a diagrammatic view of a bait container system mounted on a fishing vessel and having incorporated therein a bait container flow regulator constructed in accordance with the present invention.

Referring now to FIG. 1, a fishing vessel 10 afloat in a body of water 20 provides support for an individual 30 engaged in the act of fishing using a fishing pole 40 and, optionally, associated harness equipment 50 of conventional design. A bait container, and more specifically a bait bag assembly 60, is mounted to the stern gunwale 70 and stern wall 80 of the vessel 10, above the level of the water 20. Water is provided to the bait bag assembly 60 through an inlet line 90 that is connected to water pump (not shown) in the vessel 10.

Figure 2:
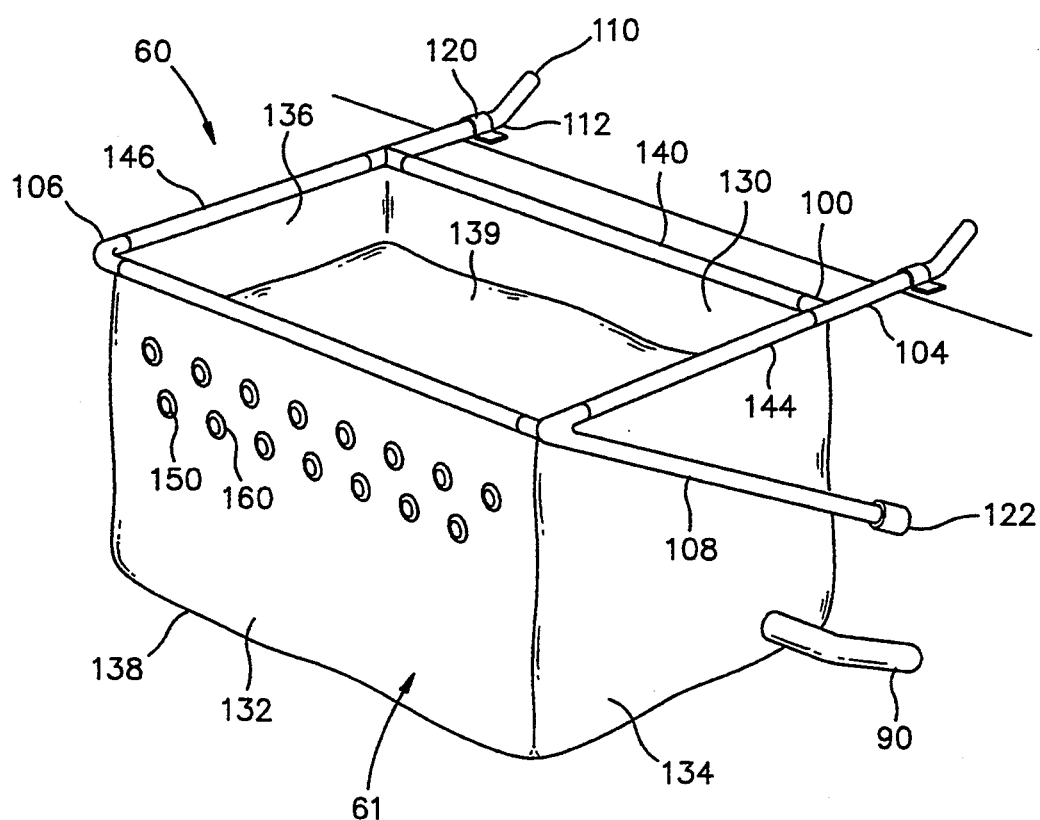
FIG. 2 is a partial diagrammatic projected view of the bait container system of FIG. 1.

As shown in more detail in FIG. 2, the bait bag assembly 60 has a vessel attachment system for attaching the bait bag assembly to the vessel 10 that includes a frame having forward and rearward transverse frame members 100 and 102 extending parallel to each other. The frame further includes a pair of upper longitudinal frame members 104 and 106 extending forwardly from the rearward transverse frame member 102 and parallel to each other, and a pair of lower longitudinal frame members 108 and 109 extending forwardly and downwardly from the rearward transverse frame member 102 and parallel to each other. The upper longitudinal frame members 104 and 106 each extend to a forward terminus 110 that includes an upward bend 112. Although a frame is provided in FIGS. 1 and 2 for use in attaching the bait bag assembly to the vessel 10, it will be appreciated that many other methods of attachment could be employed.

The frame is secured to the vessel 10 using a pair of conventional mounting clamps 120 that extend over the upper longitudinal frame members 104 and are secured to the stern gunwale 70 by conventional fasteners. Vertical frame support and positioning is aided by the lower longitudinally extending frame members 108. These frame members include a resilient cover 122 over the forward ends thereof which contact the stern wall 80 of the vessel 10. The upward bend 112 of the upper longitudinal frame members prevents the frame from sliding rearwardly out of attachment with the clamps 120 while the frame is so positioned. The frame can be readily removed from the clamps 120, however, by lifting the transverse frame member 102 upwardly to pivot the frame and enable the terminus portions of the upper longitudinal frame members to be pulled through the clamp 120.

The bait bag assembly 60 further includes a bait bag 61 made from a flexible, durable woven material such as a polyester weave. A variety of other flexible materials could be used. The bait bag 61 could also be made from a non-flexible material, such as fiber glass, in which case the frame described above may not be necessary. Non-flexible materials, however, can be awkward to store.

The foregoing bait container configurations are illustrated by way of example only. As such, it will be understood that the bait container flow regulator of the present invention could be used with virtually any bait container without regard to size, shape or materials of construction.

The bait bag 61 includes a forward wall 130, a rearward wall 132, a pair of side walls 134 and 136, a bottom 138, and an open (or closable) top 139 defining in combination a fluid carrying chamber or water containment vessel. The side walls 134 and 136, and the bottom 138 are thin relative to their cross-sectional areas such that the bait bag 61 is shell-like structure. To attach the bait bag 61 to the frame, the upper edges of each of the walls 130, 132, 134 and 136 are folded over the respective frame members 100,102,104 and 106 and affixed to the walls to form attachment loops 140,142,144 and 146, respectively. The wall 132 further includes a drainage system having a plurality of water outlet apertures 150 each of which may have conventional brass grommets 160 therein to prevent rips and tears in the bag. Many other drainage systems could also be employed, as for example, a system having only single aperture or systems having apertures at other locations.

The bait bag assembly 60 thus functions to support a reservoir of water in the water containment vessel provided by the bait bag 61 for containing one or more live bait fish for transport on the vessel 10 to a fishing site. A supply of fresh oxygenated water is provided through the inlet line 90 which in FIG. 2 is shown as extending into a lower portion of the bait bag 61. The water inlet line 90 preferably has a threaded fitting mounted to the terminal end thereof to facilitate attachment to the bait bag 61.

Figures 3, 4:
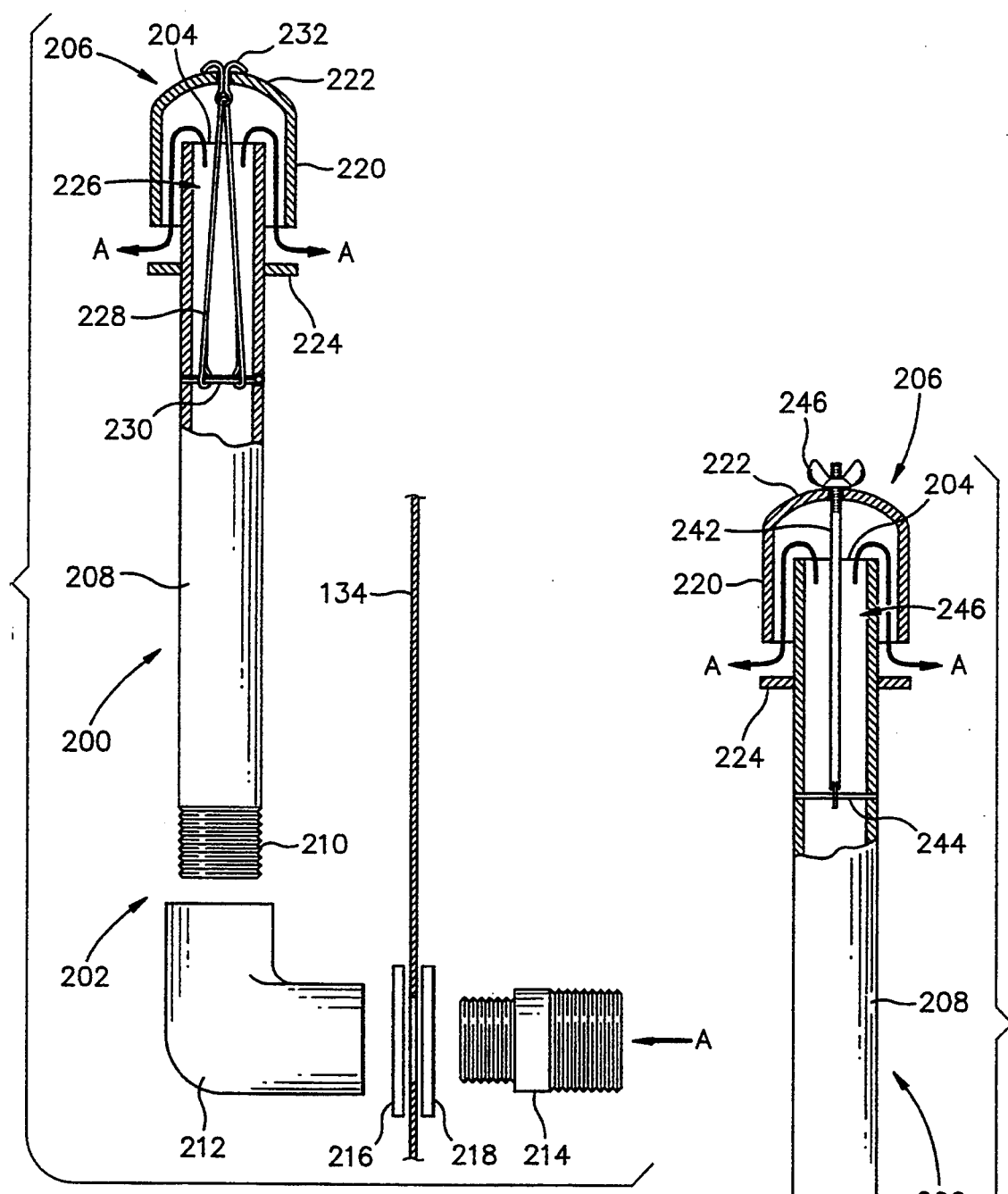
FIG. 3 is a detailed side view of a bait container flow regulator constructed in accordance with a first aspect of the invention.
FIG. 4 is a detailed side view of a bait container flow regulator constructed in accordance with a second aspect of the invention.

Referring now to FIG. 3, a bait container flow regulator 200 includes a water inlet conduit 202 that is mountable to the water inlet line 90 and sized to extend to a water discharge location in the bait bag 61, as discussed in more detail below. A water regulating outlet 204 is formed at the upper end of the water inlet conduit 202 at the water discharge location. A discharge cap 206 is mounted on the water inlet conduit 202 for limiting the flow of water provided by the water inlet line 90 through the water regulating outlet 204. The discharge cap 206 is configured for movement in response to the flow of water between a first position substantially covering the water regulating outlet 204 when little or no water is flowing in the water inlet conduit 202, to a second position wherein the water regulating outlet 204 is at least partially uncovered as water flow in the water inlet conduit 202 increases.

The water inlet conduit 202 may be formed from conventionally available plumbing components. Thus, the water inlet conduit 202 may include a generally tubular stand pipe 208 having a threaded lower end portion 210 and whose upper end portion defines the water regulating outlet 204. The stand pipe 208 is threadably mounted in a 90° degree elbow fitting 212 which extends to one of the bait bag walls 132,134 or 136. In FIG. 3, the flow regulator 200 is shown being mounted on bait bag wall 134. The 90° elbow 212 is internally threaded and is mounted to the wall 134 using a double threaded plug member 214. One end of the plug member 214 threads into the elbow 212 and traps a pair of washers 216 and 218 on either side of the bait bag wall 134. The water inlet 90 is adapted to be threadably mounted on the other end of the plug 214.

The discharge cap 206 is a domed-shaped component having a cylindrical side wall 220 and a domed top 222. The first position of the discharge cap 206 is defined by an annular disk 224 which is mounted on the stand pipe 208 below the water regulating outlet 204. The disk member 224 provides a flow diffuser that directs the flow of water emerging from the water regulating outlet generally horizontally and thus parallel to the top and bottom of the bait bag 61. In the first position of the discharge cap 206, the side wall portion 220 seats against the flow diffuser 224. The second position of the discharge cap is defined by a connector system 226 that limits the movement of the discharge cap 206 at the second position in response to water flow in the water inlet conduit 202. The connector system 226 is provided by a resilient connection member such as a rubber band 228 that is looped around an anchor pin 230 extending through the stand pipe 208 and a fastener such as the cotter pin 232 extending through the top of the discharge cap 206. The resilient connection member 228 may include one or more bands of selected resilience and flexibility so as to bias the discharge cap 206 at its first position when little or no water flow is present in the water inlet conduit 202 and to constrain the discharge cap 206 to its second position under maximum flow conditions.

Referring now to FIG. 4, the bait container flow regulator 200 is shown in a second aspect wherein the connector system 226 is constructed in an alternative fashion. Thus, the connector system 226 includes a non-resilient connection member such as the threaded rod 242 extending between an anchor pin 244 mounted in the stand pipe 208 and the top of the discharge cap 206. The connection member 242 extends through the gas discharge cap and is threadably mounted to a wing nut 246, providing an adjustable stop to limit the range of motion of the discharge cap 206.

Figure 5:
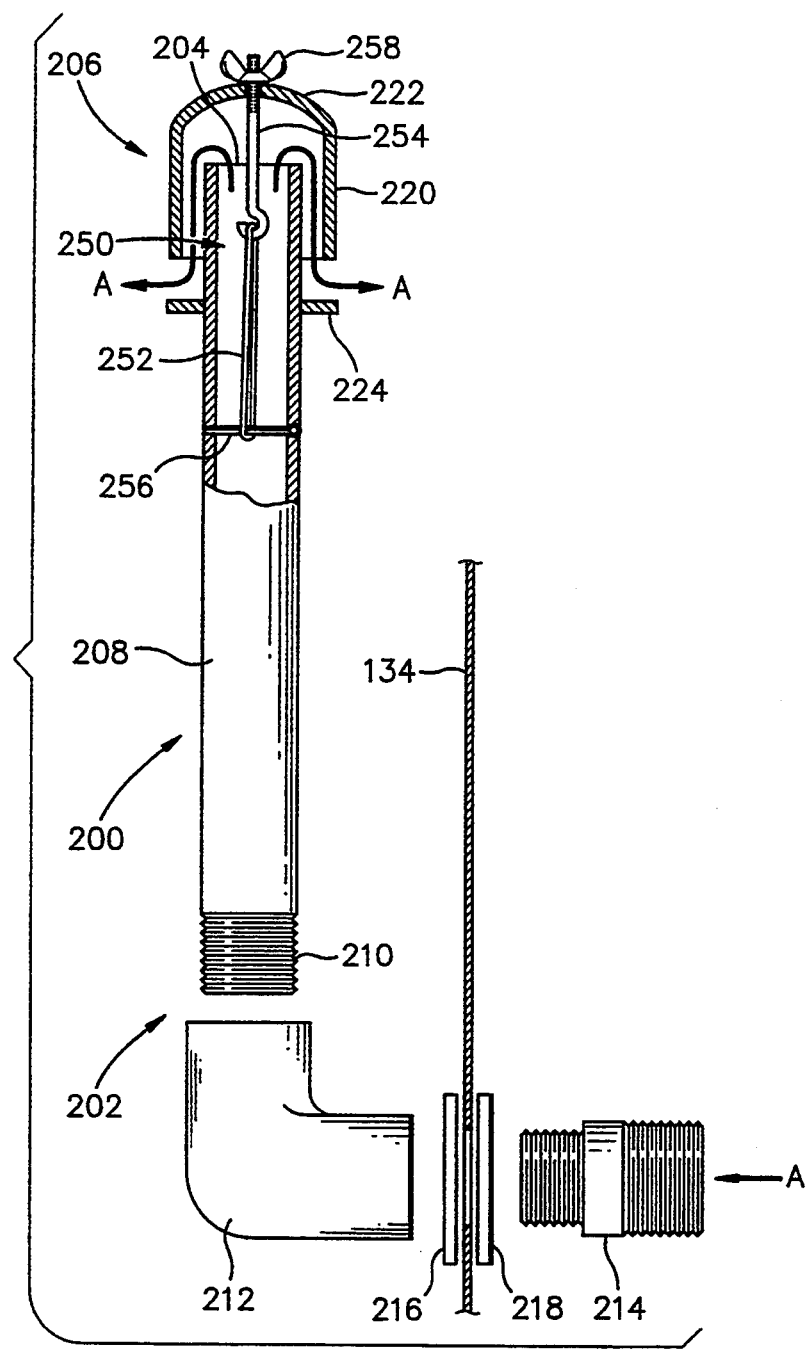
FIG. 5 is a detailed side view of a bait container flow regulator constructed in accordance with a third aspect of the invention.

Referring now to FIG. 5, the bait container flow regulator 200 is shown in still another aspect of the invention wherein a connector system 250 includes both resilient and non-resilient connection members. The resilient connection member may include one or more resilient bands such as the rubber band 252 which is attached at its lower end to an anchor pin 256 extending through the stand pipe 208. The upper end of the resilient connection member 252 is attached to a hook formed at the lower end of the non-resilient connection member 254. The upper end of the connection member 254 extends through the discharge cap 206 and is threadably mounted to a wing nut 258 which serves as an adjustable stop to limit the upward range of motion of the discharge cap 206 with respect to the non-resilient connection member 254.

Figure 6:
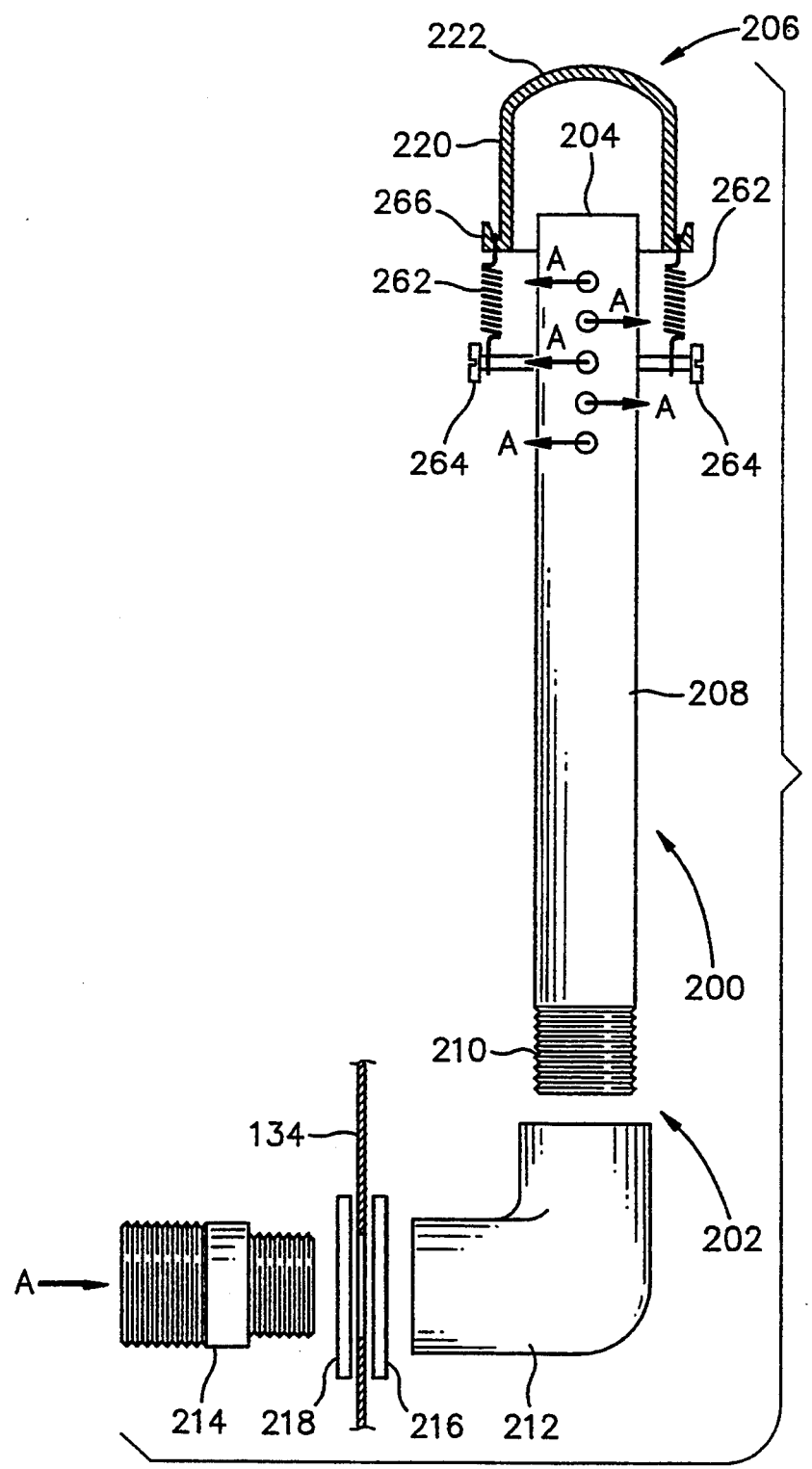
FIG. 6 is a detailed side view of a bait container flow regulator constructed in accordance with a fourth aspect of the invention.

Referring now to FIG. 6, the bait container flow regulator 200 is shown in still another aspect of the invention wherein a connection system 260 includes a plurality of resilient connection members such as springs 262 extending outside the stand pipe 208. Each spring 262 is mounted by appropriate fasteners 264 and 266 to the stand pipe 208 and the discharge cap 206, respectively. In this embodiment, the annular flow diffuser 224 is not utilized. Instead, a plurality of discharge holes 268 are provided in the stand pipe 208 to horizontally direct water flowing from the water inlet conduit 202.

Figure 7:
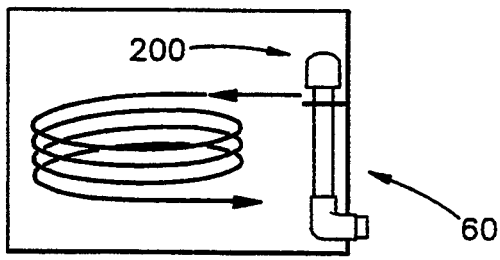
FIG. 7 is a diagrammatic rear view of an interior portion of the bait container system of FIG. 1 showing a bait container flow regulator for a downwardly water inlet.
Figure 8:
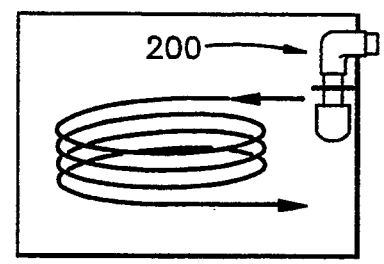
FIG. 8 is a diagrammatic rear view of an interior portion of the bait container system of FIG. 1, showing a bait container flow regulator for an upwardly disposed water inlet.

Referring now to FIGS. 7 and 8, the bait container flow regulator 200 of the present invention may be embodied in various orientations and configurations including an upwardly extending configuration as shown in FIG. 7, or a downwardly extending configuration, as shown in FIG. 8. The upwardly extending configuration is intended for systems wherein the water inlet 90 is attached near the bottom of the bait bag 61. The downwardly extending configuration of FIG. 8 is intended for systems wherein the water inlet 90 is attached at an upper location in the bait bag 61. In either configuration, the water discharge location is in approximately the same position substantially above the bottom of the bait bag assembly at a distance sufficient to minimize the disturbance of sediments at the bottom of the bait bag assembly 60.

Accordingly, a novel bait container flow regulator has been described. While various embodiments have been disclosed, it should be apparent that many variations and alternative embodiments would be apparent to those skilled in the art in view of the teachings herein. It is understood, therefore, that the invention is not to be limited except in accordance with the spirit of the appended claims and their equivalents.

We claim:

1. In a bait container system for transporting live bait to a fishing site, the bait container system including a water containment vessel for carrying water and a quantity of bait fish, the water containment vessel having a closed bottom, an open (or closable) top, a side wall portion, a water inlet for delivering a flow of water to the water containment vessel and one or more water outlets, a bait container flow regulator mounted to the water inlet, comprising:
    a water inlet conduit extending from said water inlet to a water discharge location in the water containment vessel;
    a water regulating outlet mounted on said water inlet conduit at said water discharge location; and
    a discharge cap mounted on said water inlet conduit for limiting the flow of water through said water regulating outlet, said discharge cap being configured for movement in response to said flow of water between a first position substantially covering said water regulating outlet when little or no water is flowing in said water inlet conduit to a second position wherein said water regulating outlet is at least partially uncovered as water flow in said water inlet conduit increases, said discharge cap being mounted to said water inlet conduit by a connector that limits the movement of said discharge cap at said second position in response to water flow in said water inlet conduit.

2. The bait container system of claim 1 wherein said bait container flow regulator further includes a flow diffuser mounted on said water inlet conduit, below said water regulating outlet.

3. The bait container system of claim 2 wherein said flow diffuser includes planar surface extending generally parallel to the top and bottom of the water containment vessel to direct water flow generally horizontally from said water regulating outlet so as to minimize the disturbance of sediments at the bottom of the water containment vessel.

4. The bait container system of claim 3 wherein said water inlet conduit is generally tubular and said flow diffuser is generally annular.

5. The bait container system of claim 1 wherein said connector includes a resilient connection member that biases said discharge cap to said first position when little or no water flow is present in said water inlet conduit.

6. The bait container system of claim 1 wherein said connector includes resilient and non-resilient connection members.

7. The bait container system of claim 1 wherein said connector is mounted to said water inlet conduit by an anchor pin extending through said conduit below said water regulating outlet, and wherein said connector is mounted to said discharge cap by a fastener extending through the top of said discharge cap.

8. The bait container system of claim 7 wherein said connector is a resilient band.

9. The bait container system of claim 1 wherein said connector is an adjustable shaft.

10. The bait container system of claim 7 wherein said connector is an adjustable shaft having a first end mounted to said anchor pin and a second end comprising said fastener extending through the top of said discharge cap, said fastener being threaded and adjustably secured to said discharge cap by a threaded nut.

11. The bait container system of claim 6 wherein said resilient connection member is a resilient band attached at one end to an anchor pin extending through said water inlet conduit and at a second end to said non-resilient connection member, and wherein said non-resilient connection member is a partially threaded shaft attached at one end to said resilient connection member and threadably mounted at a second end to said discharge cap.

12. The bait container system of claim 1 wherein said connector extends inside said water inlet conduit.

13. The bait container system of claim 1 wherein said connector includes plural connectors extending outside said water inlet conduit.

14. The bait container system of claim 1 wherein said water inlet conduit includes a plurality of water discharge ports positioned generally adjacent to said water regulating outlet.

15. The bait container system of claim 1 wherein said water discharge location is positioned at a substantial distance above the bottom of the water containment vessel in order to minimize the disturbance of sediments in the water containment vessel.

16. The bait container system of claim 1 wherein said water discharge location is positioned above the bottom of the water containment vessel a distance sufficient to prevent the substantial disturbance of sediments in the water containment vessel.

17. The bait container system of claim 1 wherein said water inlet extends generally upwardly from the water inlet.

18. The bait container system of claim 1 wherein said water inlet extends generally downwardly from the water inlet.

19. A bait container flow regulator for use in a bait container system for transporting live bait to a fishing site, the bait container system including a water containment vessel for carrying water and a quantity of bait fish, the water containment vessel having a closed bottom, an open (or closeable) top, a side wall portion, a water inlet for delivering a flow of water to the water containment vessel and one more water outlets, the bait container flow regulator comprising;
- a water inlet conduit mountable to said water inlet and sized to extend to a water discharge location in the water containment vessel;
- a water regulating outlet mounted on said water inlet conduit for positioning at said water discharge location;
- a discharge cap mounted on said water inlet conduit for limiting the flow of water through said water regulating outlet, said discharge cap being configured for movement in response to said flow of water between a first position substantially covering said water regulating outlet when little or no water is flowing in said water inlet conduit to a second position wherein said water regulating outlet is at least partially uncovered as water flow in said water inlet conduit increases; and
- said bait container flow regulator further including a flow diffuser mounted on said water inlet conduit, below said water regulating outlet.

20. The bait container flow regulator of claim 19 wherein said flow diffuser includes planar surface extending generally parallel to the top and bottom of the water containment vessel to direct water flow generally horizontally from said water regulating outlet so as to minimize the disturbance of sediments at the bottom of the water containment vessel.

21. The bait container flow regulator of claim 20 wherein said water inlet conduit is generally tubular and said flow diffuser is generally annular.

22. The bait container flow regulator of claim 19 wherein said discharge cap is mounted to said water inlet conduit by a connector that limits the movement of said discharge cap at said second position in response to water flow in said water inlet conduit.

23. The bait container flow regulator of claim 22 wherein said connector includes a resilient connection member that biases said discharge cap to said first position when little or no water flow is present in said water inlet conduit.

24. The bait container flow regulator of claim 22 wherein said connector includes resilient and non-resilient connection members.

25. The bait container flow regulator of claim 22 wherein said connector is mounted to said water inlet conduit by an anchor pin extending through said conduit below said water regulating outlet, and wherein said connector is mounted to said discharge cap by a fastener extending through the top of said discharge cap.

26. The bait container flow regulator of claim 25 wherein said connector is a resilient band.

27. The bait container flow regulator of claim 22 wherein said connector is an adjustable shaft.

28. The bait container flow regulator of claim 25 wherein said connector is an adjustable shaft having a first end mounted to said anchor pin and a second end comprising said fastener extending through the top of said discharge cap, said fastener being threaded and adjustably secured to said discharge cap by a threaded nut.

29. The bait container flow regulator of claim 24 wherein said resilient connection member is a resilient band attached at one end to an anchor pin extending through said water inlet conduit and at a second end to said non-resilient connection member, and wherein said non-resilient connection member is a partially threaded shaft attached at one end to said resilient connection member and threadably mounted at a second end to said discharge cap.

30. The bait container flow regulator of claim 22 wherein said connector extends inside said water inlet conduit.

31. The bait container flow regulator of claim 22 wherein said connector includes plural connectors extending outside said water inlet conduit.

32. The bait container flow regulator of claim 19 wherein said water inlet conduit includes a plurality of water discharge ports positioned generally adjacent to said water regulating outlet.

33. In a bait bag system for transporting live bait to a fishing site, the bait bag system including a frame adapted to be mounted at a suitable location on a fishing vessel, and a water containment vessel mounted on the frame for carrying water and a quantity of bait fish, the water containment vessel having a closed bottom, an open (or closable) top, a plurality of side walls, a water inlet for delivering a flow of water to the water containment vessel and one or more water outlets, a bait container flow regulator mounted to the water inlet, comprising:
- a generally tubular water inlet conduit extending from said water inlet to a water discharge location in the water containment vessel, said water inlet location being at a substantially above the bottom of the water containment vessel a distance sufficient to minimize the disturbance of sediments in the water containment vessel due to water discharge from said water inlet conduit;
- a water regulating outlet mounted on said water inlet conduit at said water discharge location;
- a generally dome-shaped discharge cap mounted on said water inlet conduit for limiting the flow of water through said water regulating outlet, said discharge cap being configured for movement in response to said flow of water between a first position substantially covering said water regulating outlet when little or no water is flowing in said water inlet conduit to a second position wherein said water regulating outlet is at least partially uncovered as water flow in said water inlet conduit increases;
- a generally annular flow diffuser mounted on said water inlet conduit, below said water regulating outlet, said flow diffuser including a generally planar surface extending generally parallel to the top and bottom of the water containment vessel to direct water flow generally horizontally from said water regulating outlet so as to minimize the disturbance of sediments at the bottom of the water containment vessel;
- said discharge cap seating against said flow diffuser when is said first position; and
- said discharge cap being mounted to said water inlet conduit by a connector that limits the movement of said discharge cap at said second position despite the flow of water in said water inlet conduit, said connector including a resilient connection member attached at one end to an anchor pin extending through said water inlet conduit, and at a second end to a pin extending through said discharge cap, said resilient connection member being sized to bias said discharge cap to said first position when little or no water flow is present in said water inlet conduit and limit the movement of said discharge cap at said second position in response to a selected flow volume in said water inlet conduit.

34. A bait container flow regulator for use in a bait container system for transporting live bait to a fishing site, the bait container system including a water containment vessel for carrying water and a quantity of bait fish, the water containment vessel having a closed bottom, an open (or closeable) top, a side wall portion, a water inlet for delivering a flow of water to the water containment vessel and one more water outlets, the bait container flow regulator comprising;

a water inlet conduit mountable to said water inlet and sized to extend to a water discharge location in the water containment Vessel, said water inlet conduit including the plurality of lateral water discharge ports positioned generally adjacent to said water regulating outlet such that water discharges from said water discharge ports and said water regulator are mutually perpendicular;

a water regulating outlet mounted on said water inlet conduit for positioning at said water discharge location;

a discharge cap mounted on said water inlet conduit for limiting the flow of water through said water regulating outlet, said discharge cap being configured for movement in response to said flow of water between a first position substantially covering said water regulating outlet when little or no water is flowing in said water inlet conduit to a second position wherein said water regulating outlet is at least partially uncovered as water flow in said water inlet conduit increases.

35. A bait container flow regulator for use in a bait container system for transporting live bait to a fishing site, the bait container system including a water containment vessel for carrying water and a quantity of bait fish, the water containment vessel having a closed bottom, an open (or closeable) top, a side wall portion, a water inlet for delivering a flow of water to the water containment vessel and one or more water outlets, the bait container flow regulator comprising:

a water inlet conduit mountable to said water inlet and sized to extend to a water discharge location in the water containment vessel;

a water regulating outlet mounted on said water inlet conduit for positioning at said water discharge location; and a discharge cap mounted on said water inlet conduit for limiting the flow of water through said water regulating outlet, said discharge cap being configured for movement in response to said flow of water between a first position substantially covering said water regulating outlet when little or no water is flowing in said water inlet conduit to a second position wherein said water regulating outlet is at least partially uncovered as water flow in said water inlet conduit increases, said discharge cap being mounted to said water inlet conduit by a connector that limits the movement of said discharge cap at said second position in response to water flow in said water inlet conduit.

* * * * *